United States Patent
Jayaraman et al.

(10) Patent No.: US 6,963,549 B1
(45) Date of Patent: Nov. 8, 2005

(54) TECHNIQUE FOR RESERVING BANDWIDTH FOR COMMUNICATIONS OVER A WIRELESS SYSTEM

(75) Inventors: Vinod Jayaraman, San Mateo, CA (US); Hitoshi Takanashi, Fremont, CA (US)

(73) Assignee: NTT Multimedia Communications Laboratories, Inc., Palo Alto, CA (US)

( * ) Notice: Subject to any disclaimer, the term of this patent is extended or adjusted under 35 U.S.C. 154(b) by 0 days.

(21) Appl. No.: 09/491,569

(22) Filed: Jan. 26, 2000

(51) Int. Cl.[7] .............................................. H04Q 7/24

(52) U.S. Cl. ....................... 370/328; 370/338; 370/445

(58) Field of Search ................................ 370/329, 330, 370/336–338, 345–348, 431, 442, 341, 352–356, 370/468, 445, 447, 448

(56) References Cited

U.S. PATENT DOCUMENTS

| | | | | |
|---|---|---|---|---|
| 5,420,864 A | * | 5/1995 | Dahlin et al. ................ | 370/347 |
| 5,745,694 A | * | 4/1998 | Egawa et al. ................ | 709/225 |
| 5,875,186 A | * | 2/1999 | Belanger et al. ............ | 370/331 |
| 6,115,390 A | * | 9/2000 | Chuah ......................... | 370/348 |
| 6,370,153 B1 | * | 4/2002 | Eng ............................ | 370/438 |
| 6,469,997 B1 | * | 10/2002 | Dorenbosch et al. ........ | 370/337 |
| 6,493,335 B1 | * | 12/2002 | Darcie et al. ............... | 370/348 |

* cited by examiner

*Primary Examiner*—Ajit Patel
(74) *Attorney, Agent, or Firm*—Trop, Pruner & Hu, P.C.

(57) ABSTRACT

A method that is useable with a wireless medium and local stations includes communicating a request between one of the local stations and a central authority to reserve a time slot for transmitting from the local station. The central authority is used to selectively reserve the time slot based on at least in part a reservation schedule. If the central authority reserves the time slot, then during the time slot, the central authority prevents the other local stations from transmitting.

37 Claims, 4 Drawing Sheets

TECHNIQUE FOR RESERVING BANDWIDTH FOR COMMUNICATIONS OVER A WIRELESS SYSTEM

BACKGROUND

The invention generally relates to wireless communications, and more specifically, the invention relates to a technique for reserving bandwidth for communications over a wireless system.

Wireless systems, such as wireless local area networks (LANs), for example, have been supporting the communication of digital data for the past several years. Most recently, wireless systems are being used to communicate data for real time applications, such as applications that involve the transmission of voice and/or video data.

As an example, a wireless LAN may include several local stations, each of which forms a node of the wireless LAN. The wireless LAN may be subdivided into cells, and in each of the cells, the constituent nodes may communicate with an access point (AP). The AP, in turn, typically establishes communication with a wired network, such as an Ethernet network, for example.

Due to the wireless communication, one local station may attempt to transmit a frame of data at the same time that another local station or the AP attempts to transmit a frame of data, a condition called a "collision." For purposes of preventing a collision from occurring, the wireless LAN may use a carrier sense multiple access/collision avoidance (CSMA/CA) contention scheme. In this scheme, before a local station transmits a frame, the local station determines if the wireless transmission medium is free from any carrier waves, and if not, the local station backs off from transmitting the frame for a time that is specified by a collision avoidance algorithm.

Because many of the local stations may be simultaneously attempting to communicate frames over the wireless transmission medium, a real time video or voice data stream of frames that is being communicated between one of the local stations and the AP may be continually interrupted due to the above-described contention scheme. Unfortunately, the real time traffic typically requires a relatively high bandwidth and has severe delay constraints, and these interruptions may limit the bandwidth that is available for the real time transmissions. In addition, wireless LANs are plagued with interference problems. Due to the inherent mobility within wireless networks, traditional schemes, such as those used with wired networks, cannot be directly applied.

Thus, there is a continuing need for a technique to address one or more of the problems that are stated above.

SUMMARY

In an embodiment of the invention, a method that is useable with a wireless medium and local stations includes communicating a request between one of the local stations and a central authority over the wireless medium to reserve a time slot for transmitting from the local station. The central authority is used to selectively reserve the time slot based on at least in part a reservation schedule. If the central authority reserves the time slot, then during the time slot, the central authority prevents the other local stations from transmitting.

Advantages and other features of the invention will become apparent from the following description, from the drawing and from the claims.

DETAILED DESCRIPTION

Figure 1:
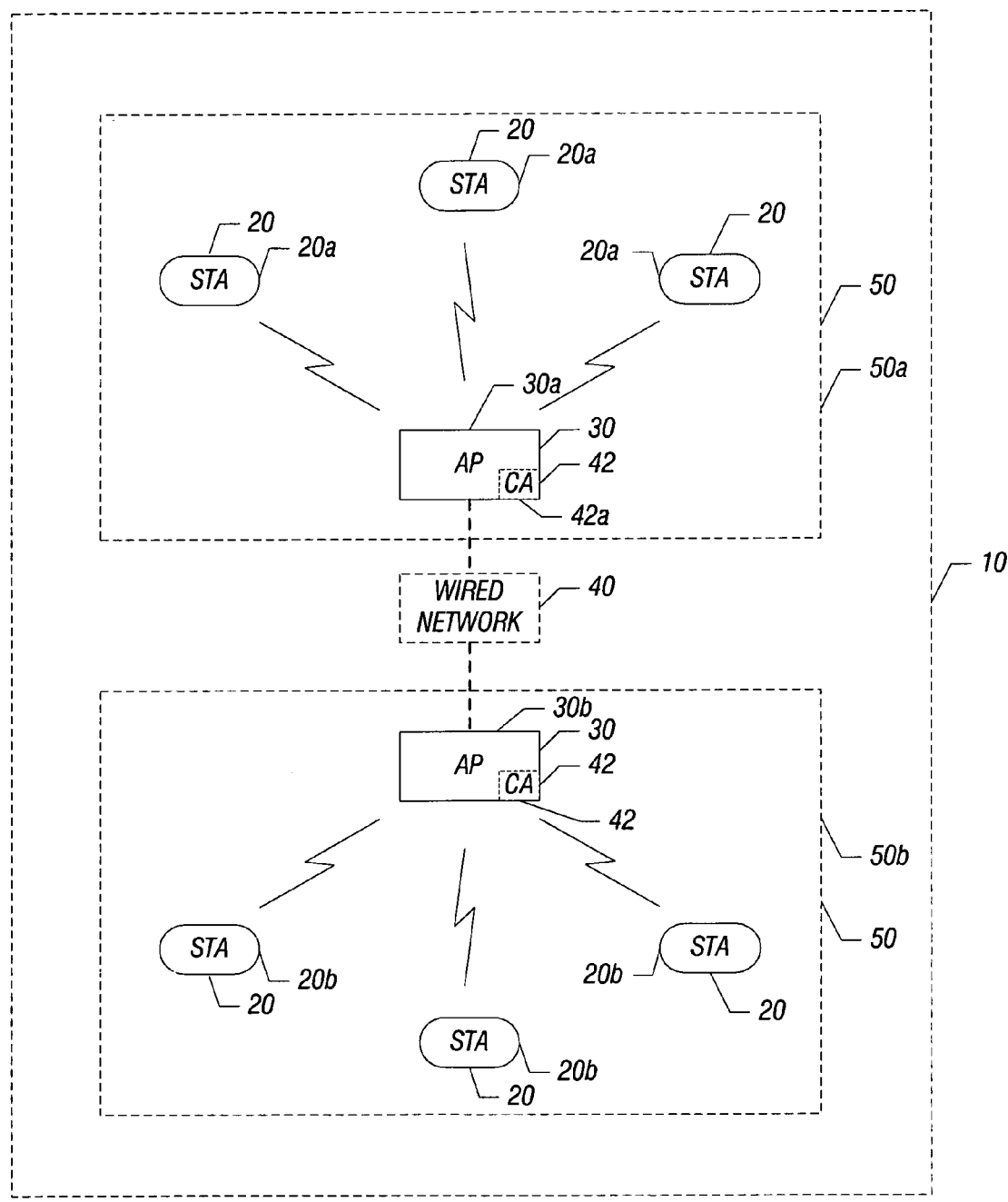
FIG. 1 is a schematic diagram of a wireless system according to an embodiment of the invention.

Referring to FIG. 1, an embodiment 10 of a wireless system in accordance with the invention uses a local medium reservation technique to schedule access to a wireless transmission medium. In this manner, the wireless system 10 includes local stations 20 (stations 20a and 20b, as examples) that may each reserve exclusive access to the wireless transmission medium for a scheduled time slot. During this scheduled time slot, the local station 20 that holds the reservation may communicate several frames without being interrupted by another one of the local stations 20. As a result of this arrangement, the system 10 supports high bandwidth wireless communications that are well suited for real time data, such as voice and/or video traffic. To accomplish these features, the system 10 is designed to maintain information regarding future traffic over the wireless medium, prioritize real time traffic over non-real time data and schedule access to the shared medium, as described below.

More particularly, in some embodiments of the invention, the system 10 may include cells 50 that each includes a group of the local stations 20. Thus, as an example, a cell 50a may include the three local stations 20a that are depicted in FIG. 1, and another cell 50b may include the three local stations 20b that are also depicted in FIG. 1. Each cell 50, in turn, may include an access point (AP) 30 that establishes communication between the local stations 20 of the cell 50 and a wired network 40, such as an Ethernet network, for example, or the APs 30 may communicate with each other through the wireless interface.

In some embodiments of the invention, the stations 20 and 30 use a contention protocol, such as a Carrier Sense Multiple Access/Collision Avoidance (CSMA/CA) protocol, for purposes of avoiding collisions for contention access to the wireless transmission medium. In some embodiments of the invention, the IEEE 802.11 wireless local area network (WLAN) standard may generally govern communication across the wireless medium.

Figure 2:
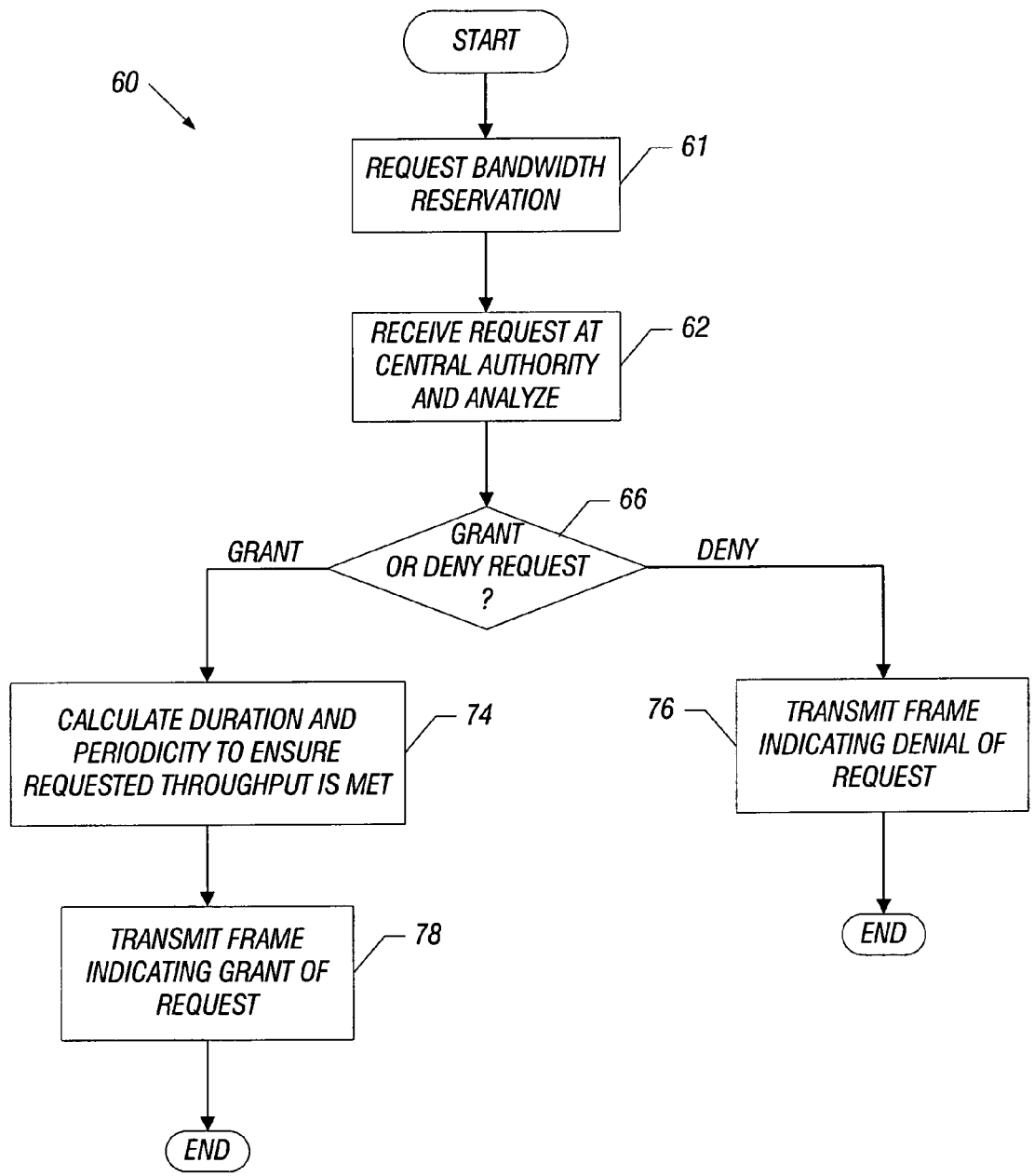
FIG. 2 is a flow diagram depicting a medium reservation technique according to an embodiment of the invention.

For purposes of reserving a time slot (i.e., for purposes of reserving bandwidth) to the wireless medium for real time access, the system 10 uses carrier sense information and properties of the real time traffic (voice, streaming video, etc.) in its medium reservation policy, as described below. In this manner, in some embodiments of the invention, each cell 50 includes a central authority 42 (that may be located within the AP 30 of the cell 50, for example) that interacts with a particular local station 20 to reserve bandwidth using a technique 60 that is depicted in FIG. 2. Referring to FIG. 2, more particularly, a local station 20 may request (block 61 of FIG. 2) that a particular bandwidth be reserved for a given traffic type over a defined period of time. This reservation request is received and analyzed (block 62) by the central authority 42; and depending upon the underlying network properties, desired traffic characteristics and the policy applicable to the requesting real time station, the central authority 42 determines (diamond 66) whether the central authority 42 will grant or deny the request. Based on this determination, the central authority 42 communicates a frame to the requesting station 20 indicating either denial (block 76) or the grant (block 78) of the request.

If the request is granted, the central authority 42 calculates (block 74) the duration and the periodicity of the transmissions for the requesting station 20 to meet the throughput and delay requirements of the real time traffic and indicates the reserved time slot in the frame that is transmitted (block 78) to the requesting station. For purposes of tracking the reserved time slots and for purposes of determining which time slots are available, the central authority 42 uses a reservation vector that is described below.

In some embodiments of the invention, the system 10 uses the properties of carrier sense functions that determine the state of the wireless transmission medium to ensure that no other local station 20 attempts to transmit during a reserved time slot. For example, in some embodiments of the invention, the system 10 uses the CSMA/CA protocol, a protocol that uses physical and virtual carrier sense functions are used to determine the state of the wireless medium. When either the physical or the virtual carrier sense functions of a local station 20 that needs to transmit indicate that the wireless transmission medium is busy, transmission is deferred.

The virtual carrier sense mechanism in CSMA/CA takes the form of a Network Allocation Vector (NAV) that indicates the busy status and the duration of transmission over the wireless medium. The central authority 42 uses this virtual carrier sense mechanism and before each reserved time slot begins (as indicated by the reservation vector), it transmits frames that include information to populate the NAVs (that are maintained locally by all stations 20 within the cell 50) with indication that the wireless transmission medium is busy during the upcoming reserved timeslot. This action causes the virtual carrier sense function, provided by the Medium Access Control (MAC) layer in each station 20, to conclude that the wireless transmission medium is busy during the reserved period.

Therefore, in the scheme described herein, each local station 20 makes the medium access decision locally but the medium reservation control is carried out centrally by the central authority 42. In some embodiments of the invention, the scheme may be used across multiple cells 50 in the following manner. First, the requesting local station 20 transmits the initial reservation request to the local central authority that, in turn, transits the request across all cells 50 where bandwidth reservation is required. For example, the cells 50 in which this occurs may be all cells 50 that are adjacent to and including the cell 50 of the requesting station 20. Next, the central authorities 42 of these cells 50 reserve the time slots (if possible) and update their reservation vectors. Reserving the bandwidth across adjacent cells 50 provides a solution to prevent interference from adjoining cells.

Figure 3:
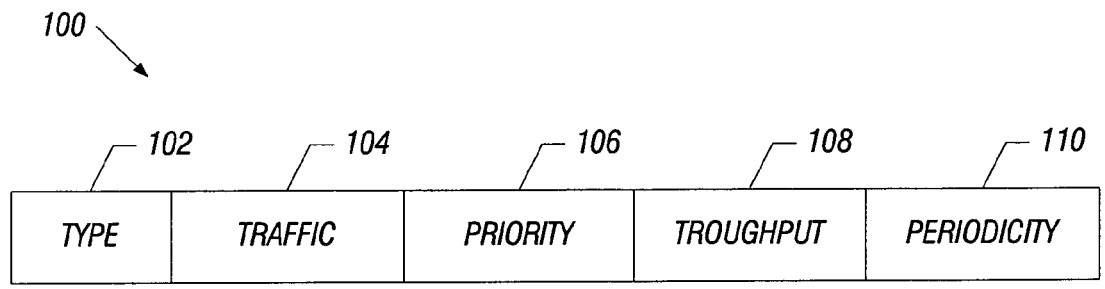
FIG. 3 is an illustration of a reservation request frame according to an embodiment of the invention.

FIG. 3 depicts a Reservation Request Frame (RRF) 100 that is transmitted by a local station 20 to reserve a specified bandwidth over a predefined period of time. One field 102 of the RRF 100 indicates a type of the frame. In this manner, the RRF 100 may be a reservation, cancellation, or refresh frame. A local station 20 transmits a reservation type RRF 100 for purposes of requesting the reservation of bandwidth for a particular time slot. A local station 20 transmits a cancellation type RRF to cancel a previously reserved time slot. A local station 20 transmits a refresh type RRF to renew a reserved time slot. A central authority 42 may also transmit a refresh type RRF after a particular reserved time slot expires to alert the corresponding local station 20 that renewal of the time is required, as further described below.

Another field 104 of the RRF 100 indicates a type of the traffic to be transmitted during the reserved time slot. For example, the field 104 may indicate whether the traffic to be transmitted during the reserved time slot is voice or streaming video traffic. A field 106 of the RRF 100 indicates a priority of the traffic. Another field 108 of the RRF 100 indicates the required throughput for the given type of traffic. Use of the field 108, in some embodiments of the invention, is optional and may be used only if the traffic type is unknown. The RRF 100 may also include a field 110 to indicate the periodicity, the maximum time interval between successive transmissions. In some embodiments, the field 110 is optional and may be used only if the traffic type is unknown.

Figure 4:
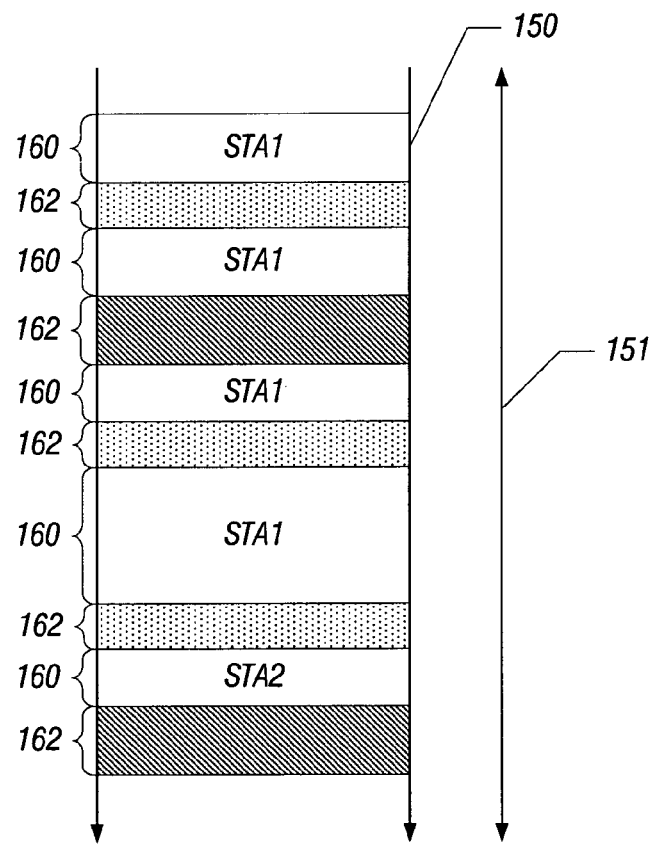
FIG. 4 is an illustration of a reservation vector according to an embodiment of the invention.

Upon reception of an RRF 100, the central authority 42 examines the parameters indicated by the RRF 100 and the central authority's reservation vector to determine if a time slot may be reserved. An exemplary reservation vector 150 is depicted in FIG. 4. As shown, the reservation vector 150 indicates a bandwidth reservation window 151 that includes time slots 160 that are reserved for the local stations 20. For example, a particular local station 20 may have time slots 160 in that are denoted by "STA1", and another station 20 may have time slots 160 (in the reservation vector 150) that are denoted by "STA2." As shown, in some embodiments, any two adjacent reserved time slots 160 are separated from each other by a contention time slot 162, a time slot in which the local stations 20 that do not have reserved periods may transmit using the CSMA/CA contention protocol.

Once the central authority 42 receives an RRF that requests a reservation, the central authority 42 ascertains if sufficient resources are available based on the throughput offered by the underlying network, the latency, carrier sense information, the amount of requested bandwidth, and the policy that is applicable to the requesting local station 20. If resources are available, then the central authority 42 calculates the duration (called "t") of each transmission according to the following formula:

$$t = \rho \cdot \frac{R_t}{A_t} + \lambda, \qquad \text{Equation 1}$$

where "$R_t$" is the required throughput, "$A_t$" is the throughput offered by the underlying network, "$\rho$" is the periodicity and "$\lambda$" is the network latency. Once the central authority 42 fulfills the request, the central authority 42 transmits an acknowledgment frame to the requesting station 20, a frame that indicates the time at which the reserved time slot begins.

Figure 5:
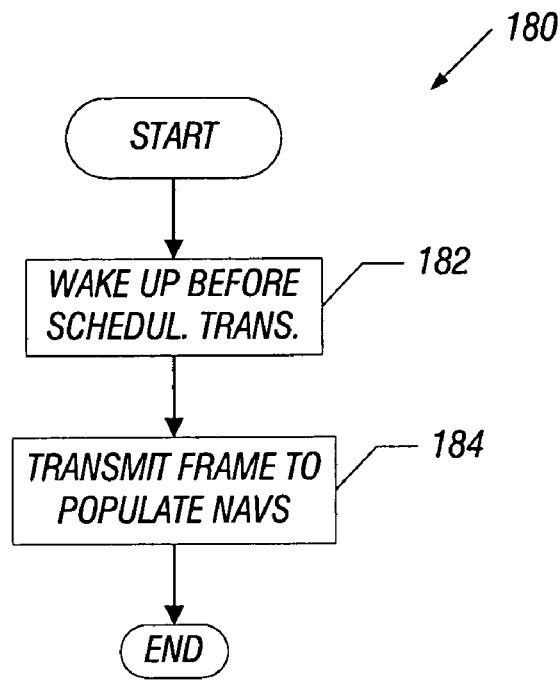
FIG. 5 is a flow diagram depicting a technique used by a scheduler of a central authority according to an embodiment of the invention.

The central authority 42 includes a scheduler that performs a technique 180 that is depicted in FIG. 5. In the technique 180, the scheduler "wakes" up (block 182) before each scheduled transmission period and transmits (block 184) a frame that populates the NAVs of the local stations 20 that are not going to transmit during the reserved time slot with the duration of the next reserved transmission. This event causes the virtual carrier sense mechanism that is provided by the MAC layer of each local station 20 to conclude that the medium is busy and defer transmission.

Therefore, the medium access decision is taken by the virtual carrier sense mechanism local to each station 20, and the reservation control information is sent by the central authority 42.

The central authority 42 grants a reserved time slot only for a determined period of time, and the duration of this time may be negotiated with the requesting station 20 when the requesting station 20 transmits a reservation request (in the form of an RRF) for the first time. Basing the duration of the time slot on the available resources (as described above), the central authority 42 responds to the request with an indication of the actual period of time for which the reservation is granted. At the expiration of a reservation period, the central authority 42 sends out a refresh notice (via an RRF frame 100) to the appropriate local station 20. If the local station 20 does not respond with a refresh request (via an RRF frame 100), the central authority 42 frees up any resources that are allocated to the local station 20 and removes the associated time slot from its reservation vector.

Reservation periods may be cancelled by local stations 20 (via an RRF frame 100), and upon reception of a reservation cancellation frame from a particular local station 20, the central authority frees up the time slot 160 (and thus, the bandwidth) that is allocated to the station 20 and adds the additional time to the contention free time slots 162. In some embodiments, the central authority 42 may free up the time slots 160 that are allocated to a particular local station 20 if that local station 20 does not transmit during one of its allocated time slots 160.

The scheme described above has the added advantage of working well even when adjacent cells 50 share the same frequency. In this manner, the frame transmitted by the central authority 42 to populate the NAVs would also be received by stations in the adjacent cell 50, which would lead to them defer transmissions during the reserved period. Thus, interference from neighboring cells 50 is minimized in the above-described scheme.

Figure 6:
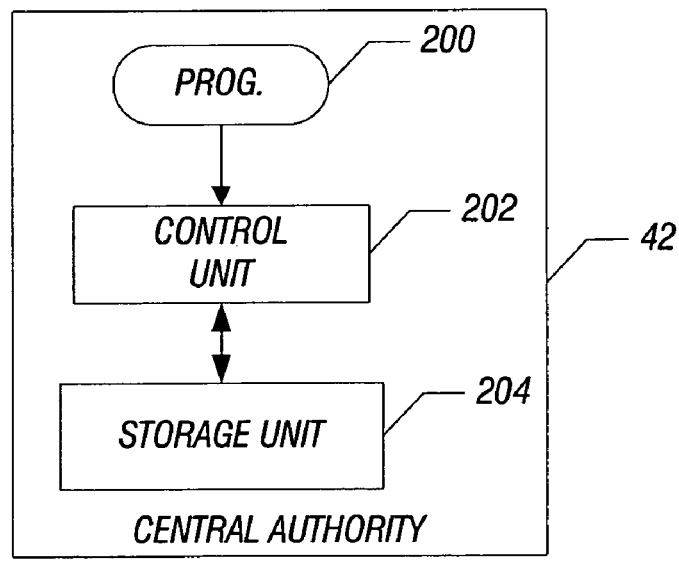
FIG. 6 is a schematic diagram of a central authority according to an embodiment of the invention.

Referring to FIG. 6, in some embodiments of the invention, the central authority 42 may include a control unit 202 (a computer, a computer unit, a microprocessor or any other type of processor, as examples) that may execute routines in the form of a program 200 to perform the scheduling and reservation techniques that are described herein. The central authority 42 may include a storage unit 204 (a hard disk drive or a CD-ROM drive, as examples) that may store a copy of the program 200. Other arrangements are possible.

Other embodiments are within the scope of the following claims. For example, in cases where multiple access points are present within the same cell 50, in some embodiments of the invention, the central authority 42 may dynamically choose to route real time traffic through the access point that has the least existing traffic. As another example, in cases where carrier frequencies overlap in the same cell 50, in some embodiments of the invention, the central authority 42 may choose to transmit real time traffic using the carrier frequency that best meets a predefined criteria, such as the carrier frequency in which previous communications had the least error rate or the carrier frequency in which previsous communications had the shortest latencies, as examples.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method usable with a wireless medium and local stations, comprising:
   communicating a request between one of the local stations and a central authority to reserve a time slot for transmitting from said one of the local stations;
   using the central authority to selectively reserve the time slot based on at least in part a reservation schedule; and
   if the central authority reserves the time slot, in response to the beginning of the time slot, transmitting data to the other local stations to prevent the other local stations from transmitting.

2. The method of claim 1, further comprising:
   transmitting real time information from said one of the local stations during the time slot.

3. The method of claim 2, wherein the real time information indicates an audio stream.

4. The method of claim 2, wherein the real time information indicates a video stream.

5. The method of claim 1, wherein the local stations and the central authority form at least part of a wireless local area network.

6. The method of claim 1, wherein the communicating the request comprises:
   transmitting a reservation frame between said one of the local stations and the central authority.

7. The method of claim 6, wherein the reservation frame indicates one or more of the following:
   a traffic priority, a start time, and a traffic type.

8. The method of claim 6, wherein the reservation frame indicates a required throughput and a periodicity of transmissions if the central authority does not know a traffic type of the communication.

9. The method of claim 1, wherein the central authority bases reservation of the time slot at least in part on underlying network properties.

10. The method of claim 9, wherein the underlying network properties may include one or more of the following:
    a throughput, latency and the bit error rate in the transmission of frames.

11. The method of claim 1, wherein the central authority bases reservation of the time slot at least in part on characteristics of a traffic to be transmitted during the time slot.

12. The method of claim 11, wherein the characteristic may include one or more of the following:
    a required throughput and a maximum delay between successive frames that are communicated over the wireless medium.

13. The method of claim 1, wherein the central authority bases reservation of the time slot at least in part on an amount of bandwidth already reserved for other stations.

14. The method of claim 1, wherein the central authority bases reservation of the time slot at least in part on a policy associated with said one of the local stations.

15. The method of claim 1, further comprising:
    communicating between the central authority and said one of the local stations to indicate acceptance or refusal of the request.

16. The method of claim 1, further comprising:
    before the beginning of the reserved time slot, transmitting a frame from the central authority to update a network allocation vector of each local station with a duration of the time slot to cause at the remaining local stations to ascertain that the wireless medium is busy during the time slot.

17. The method of claim 1, wherein the selective reservation by the central authority is further based at least in part on the reservation schedule maintained by the central authority, and the local stations and the central authority are associated with a cell, the method further comprising:
communicating the request the central authority and another central authority that is associated with another cell.

18. The method of claim 1, further comprising:
using the central authority to cancel the reserved time slot.

19. The method of claim 18, wherein the central authority selectively cancels the reserved time slot based on whether said one of the local stations did not transmit during a previously scheduled time slot.

20. The method of claim 18, wherein the central authority selectively cancels the reserved time slot based on whether said one of the local stations transmits a cancellation request.

21. The method of claim 1, wherein at least some of the local stations are located within a cell that includes multiple access points, the method further comprising:
using the central authority to route real time traffic through the one of the access points that has the least amount of existing traffic.

22. The method of claim 1, wherein at least some of the local stations are located within a cell that has multiple carrier frequencies that overlap in the cell, the method further comprising:
using the central authority to transmit real time traffic using the carrier frequency that best meets a predefined criteria.

23. The method of claim 22, wherein the predefined criteria comprises at least one of the following: bit error rate and the latency of the medium.

24. A wireless communication system comprising:
local stations; and
a central authority to:
communicate with the local stations over a wireless medium,
receive a request from one of the local stations to reserve a time slot for transmissions from said one of the local stations,
selectively reserve the time slot based on at least in part a reservation schedule, and
if the time slot is reserved, in response to the beginning of the time slot transmit data to the other local stations to prevent the other local stations from transmitting.

25. The system of claim 24, wherein said one of the local stations transmits real time information during the time slot.

26. The system of claim 24, wherein said one of the local stations is adapted to transmit a reservation frame to the central authority to communicate the request.

27. The system of claim 26, wherein the reservation frame indicates one or more of the following:
a traffic priority, a start time, and a traffic type.

28. The system of claim 26, wherein the reservation frame indicates a required throughput and a periodicity of transmissions if the central authority does not know a traffic type of the communication during the time slot.

29. The system of claim 24, wherein the central authority, before the beginning of the reserved time slot, transmits a frame to update a network allocation vector of each local station with a duration of the time slot to cause at the remaining local stations to ascertain that the wireless medium is busy during the time slot.

30. The system of claim 24, wherein the selective reservation by the central authority is further based at least in part on the reservation schedule maintained by the central authority, the local stations and the central authority are associated with a cell, and the central authority is adapted to communicate the request between the central authority and a second central authority that is associated with another cell.

31. An article comprising a machine-readable storage medium storing instructions to cause a control unit to:
communicate with local stations over a wireless medium,
receive a request from one of the local stations to reserve a time slot for transmissions from said one of the local stations,
selectively reserve the time slot based on at least in part a reservation schedule, and if the time slot is reserved, in response to the beginning of the time slot, transmit data to the other local stations to prevent the other local stations from transmitting.

32. The article of claim 31, wherein said one of the local stations communicates real time information during the time slot.

33. The article of claim 31, wherein the storage medium stores instructions to cause the control unit, before the beginning of the reserved time slot, transmit a frame to update a network allocation vector of each local station with a duration of the time slot to cause at the remaining local stations to ascertain that the wireless medium is busy during the time slot.

34. The article of claim 31, wherein the local stations and the control unit are associated with a cell and the control unit is adapted to communicate the request between the control unit and a central authority that is associated with another cell, the storage medium storing instructions to cause the control unit to base the selective reservation on the reservation schedule maintained by the control unit.

35. The method of claim 1, wherein the transmitting data comprises:
populating network allocation vectors of the other local stations.

36. The system of claim 24, wherein the central authority prevents the other local stations from transmitting by populating network allocation vectors of the other local stations.

37. The article of claim 31, wherein the storage medium stores instructions to cause the processor to prevent the other local stations from transmitting during the time slot by populating network allocation vectors of the other local stations.

* * * * *